United States Patent [19]

Bradley et al.

[11] Patent Number: 4,467,620

[45] Date of Patent: Aug. 28, 1984

[54] OIL INJECTOR FOR REFRIGERANTS OF AIR CONDITIONERS AND THE LIKE

[76] Inventors: Gordon C. Bradley, Box 542; Ben E. Coleman, Box 1836, both of, both of Assiniboia, Saskatchewn, Canada, S0H 0B0

[21] Appl. No.: 449,597

[22] Filed: Dec. 14, 1982

[51] Int. Cl.³ .............................................. F25B 45/00
[52] U.S. Cl. ........................................ 62/292; 62/468; 222/380
[58] Field of Search .......................... 62/84, 292, 468; 222/380, 383

[56] References Cited

U.S. PATENT DOCUMENTS

| | | | |
|---|---|---|---|
| 1,982,108 | 11/1934 | Kagi | 62/468 |
| 1,984,639 | 12/1934 | Grant et al. | 62/468 |
| 2,394,081 | 2/1946 | Lawton | 62/468 |
| 3,717,008 | 2/1973 | Bandy | 62/292 |
| 3,844,452 | 10/1974 | Blum | 222/380 |
| 3,935,713 | 2/1976 | Olson | 62/292 |
| 3,996,705 | 12/1976 | Mullins | 62/292 |
| 4,077,494 | 3/1978 | Spauoe et al. | 222/380 |
| 4,364,236 | 12/1982 | Lower et al. | 62/84 |

Primary Examiner—Ronald C. Capossela
Attorney, Agent, or Firm—Stanley G. Ade

[57] ABSTRACT

A cylinder is provided with a piston therein having a piston rod screw threadably engaging through one end cap so that rotation of the rod moves the piston along the cylinder. A filler is situated in the other end cap thus allowing the cylinder to be filled with refrigerant oil. An injection assembly is connected to the other end cap and includes a valve, a tube and a connector which may be connected to the high or low side of the refrigerant circuit of a refrigeration assembly such as an air conditioner. Once connected to the refrigerant circuit, a loosening of one union allows the refrigerant within the circuit to purge the line whereupon the union is tightened. The piston rod is marked with indicia along the length thereof so that rotation of the rod a predetermined distance indicates to the operator that a given amount of oil has been ejected from the cylinder and into the refrigerant system.

24 Claims, 3 Drawing Figures

OIL INJECTOR FOR REFRIGERANTS OF AIR CONDITIONERS AND THE LIKE

BACKGROUND OF THE INVENTION

This invention relates to new and useful improvements in oil injection means for refrigeration systems.

Relatively large or commercial refrigeration systems are usually provided with their own lubrication systems in order to supply the necessary lubricant to the compressor. However, relatively small units such as those used in house air conditioners and the like, do not include a lubrication system due to cost factors so that it is conventional to inject oil into the refrigerant thus enabling the oil to reach the compressor during the operation of the refrigeration cycle.

Normally, a two-ounce tube of oil is used with a connector for a Freon canister at one end thereof whereupon the tube is connected to the high or low pressure Freon port on one side or the other of the compressor. The Freon canister then forces the two ounces of oil into the system against the pressure of the Freon or other refrigerant already existing in the system.

It is difficult to purge air from such devices so that each time oil is injected, air is added to the Freon within the system thus interfering considerably with the refrigerant action thereof.

It is also difficult to control the amount of oil that is ejected so that much oil is wasted with conventional systems and as this refrigerant oil is relatively expensive, it adds to the cost of servicing.

SUMMARY OF THE INVENTION

The present invention overcomes these disadvantages by providing an oil ejector in which a metered amount of oil can be injected into the system and at the same time the ejection assembly of the device is easily purged.

In accordance with the invention, there is provided in a refrigeration system which includes a compressor and an evaporator with the usually conduits extending therebetween and having a refrigerant charging port on the high or low pressure sides of the compressor; a device for injecting a predetermined amount of refrigerant oil into said system, said device comprising in combination a cylinder, a piston reciprocal within said cylinder, an end cap on one end of said cylinder, a piston rod extending from one side of said piston and screw threadably engaging through said end cap whereby rotation of said piston rod moves said piston within said cylinder, a further end cap opn the other end of said cylinder, filling means in said further end cap and an injector assembly operatively connected to said further end cap, said injection assembly including a manually operated valve, means for purging said injector assembly and means for detachably connecting said injector assemblsy to the high or low pressure side of a refrigeration system for injecting oil into said system.

Another advantage of the invention is that it is readily adapted for use with a nozzle type injector for use on a refrigeration system which is not pressurized.

A further advantage of the invention is to provide a device which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 2:
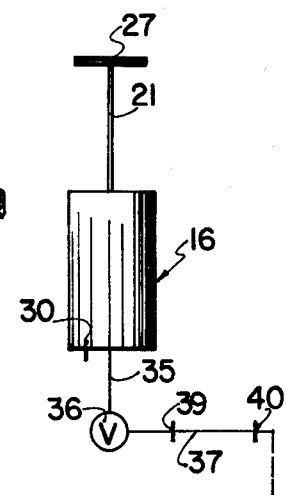
FIG. 2 is a schematic view of the device together with a schematic view of a refrigeration circuit.
Figure 2:
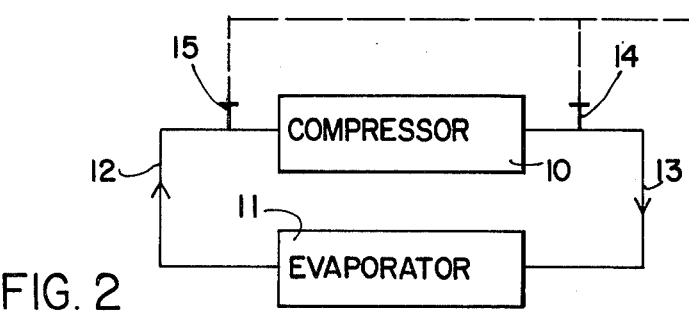

Proceeding therefore to describe the invention in detail, reference should first be made to FIG. 2 which shows a simplified schematic view of a refrigeration circuit including a compressor 10, an evaporator 11 and conventional conduits 12 and 13 operatively connecting same together. Reference character 14 illustrates a Freon charging port on the high pressure side of the compressor and reference character 15 illustrates a Freon charging port on the low pressure side of the compressor. Conventional refrigeration circuits may be provided with one or the other or both of such ports.

The device collectively designated 16 is shown in FIG. 2 operatively connectable to either the high pressure port 14 or the low pressure port 15, depending upon circumstances.

Figure 1:
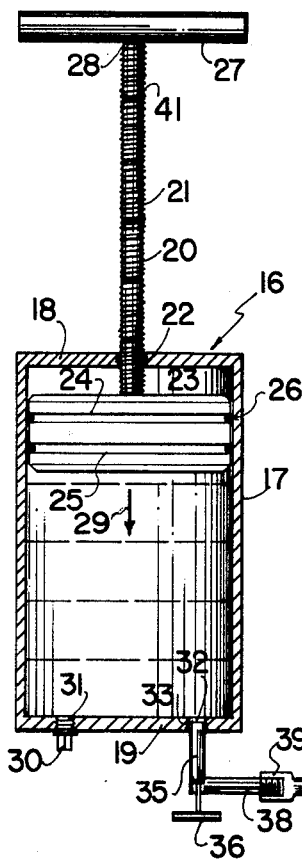
FIG. 1 is a longitudinal cross section of the device.

FIG. 1 shows a longitudinal cross section of the device 16 enlarged with respect to FIG. 2. It consists of a cylinder 17 having an end cap 18 spanning one end thereof and a further end cap 19 spanning the other end thereof. These end caps may either be welded to each end of the cylinder or screw threaded thereon or secured in any other well-known manner, thus sealing the ends of the cylinder. A piston rod 20 is screw threaded along the length thereof as illustrated by reference character 21 and screw threadably engages through an axially located screw threaded aperture 22 formed in the end cap 18. It is secured by the inner end 23 thereof, centrally to one side 24 of a piston 25 which is reciprocal within the cylinder, said piston being provided with one or more sealing rings 26 in a conventional manner. Although the piston rod 21 is shown secured to the piston 25, nevertheless it will be appreciated that this connection may be a swivel connection so that rotation of the rod 20 does not rotate the piston 25. A cross bar 27 or other form of handle is secured to the other end 28 of the piston rod to facilitate rotation of the rod within the screw threaded end cap 18 and hence control the movement of the piston 25 either in the direction of arrow 29 or in the opposite direction if opposite rotation is applied.

A detachable filler plug 30 screw threadably engages a screw threaded filler aperture 31 formed within the other end cap 19 so that when the piston is withdrawn towards the end cap 18, by rotation of rod 20, and the piston is held in a reversed position to that shown in FIG. 1, refrigerant oil (not illustrated) may be poured through the filler aperture 31 to fill the cylinder between the piston 25 and the end cap 19 whereupon the filler plug 30 is replaced. It is desirable that the cylinder be completely filled in order to eliminate any air present within the cylinder.

A further aperture or port 32 is provided within the other end cap 19 into which is secured as by screw threading 33, an injection assembly collectively designated 34. In this embodiment, it consists of a right angled conduit 35 having a manually operated valve 36 incorporated therein so that the right angled conduit can be closed or opened depending upon circumstances. A further conduit 37 screw threadably engages the distal end 38 of the right angled conduit 35 and constitutes an inlet union or connection 39.

An outlet union or connection 40 is situated at the distal end of conduit 37 and preferably consists of a valve such as a Schroeder type valve which is normally closed when not connected to either of the ports 14 or 15 of a refrigeration circuit. However, when it is connected by screw threadable engagement with one or the other of the ports, means (not illustrated) are provided which opens the valve 40 and also opens the valve 14 or 15 to which it is connected thus communicating the pressure of the refrigerant with the injection assembly.

It will be appreciated that air is present between the valve 40 and the valve 36 and it is desirable to purge this air prior to injecting oil from the cylinder 17, through the port 14 or 15 and into the refrigeration system. This may be accomplished by closing valve 36 prior to connecting valve 40 to valve 14 or 15 and then loosening the inlet union or nut 39 thus releasing a small amount of refrigerant through the valve 40 and through conduit 37 and hence through the loosened union 39 to atmosphere. As soon as the line 37 is purged, the union nut 39 is tightened.

At this point, the fill valve 36 is opened thus communicating the interior of the cylinder 17 with the conduits 12 or 13 of the system depending upon which valve 14 or 15 is being used.

Rotation of the piston rod 20 in one direction will move the piston in the direction of arrow 29 thus ejecting oil into the system against the pressure of the refrigerant.

It is desirable that the piston rod be provided with indicia 41 along the length thereof, said indicia indicating the amount of travel of the piston along the cylinder 17. This is calculated so that a predetermined amount of oil is injected into the system from the cylinder 17, when the piston rod moves through the cap 18 from one indicia to the next adjacent indicia.

As an example, the pitch of the screw threads of rod 20 and the diameter of cylinder 17 may be such that a movement of the piston rod in the direction of arrow 29, between two adjacent indicia is, for example, one inch. A similar movement is applied to the piston 25 and one inch of movement of the piston may represent one ounce of refrigerant oil. It is therefore easy to inject the exact amount of oil required and of course, one filling of the cylinder may be used to inject oil into several refrigeration systems, it being understood that valve 36 is closed off after the desired amount of oil has been injected and prior to disconnecting the valve 40 from the port 14 or 15.

Figure 1A:
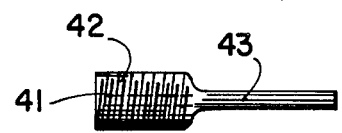
FIG. 1A is a side elevation of the alternative injection nozzle.

If the device is being used to add oil to a system which is not under pressure then instead of using the Schroeder valve connection 40 directly connected to ports 14 or 15, an injector collectively designated 41 may be used as shown in FIG. 1A. This includes a screw threaded inner end portion 42 which may be engaged within the valve 40. An open nozzle 43 extends from the other side of the portion 42 and may be used to open the port 14 or 15 whereupon the necessary amount of oil may be injected as hereinbefore described. The portion 42 should include means to open the valve 40 when same is screw threadably connected thereto. However, as such methods of connection and opening are conventional, it is not believed necessary to illustrate same.

It will be noted that if valve 36 is closed as soon as the necessary amount of oil is injected and before disconnecting valve 40 from ports 14 and 15, no air or Freon enters the cylinder 17 so that the injector may be used on other refrigeration systems.

The device is an improvement over the conventional method of injecting oil as hereinbefore described not only for the control of the amount of oil, but also eliminating the possibility of adding additional Freon under pressure from the Freon can normally used to inject oil from the relatively small container conventionally used.

Other advantages include the fact that oil may be injected into a pressurized system or non-pressurized system without the use of Freon thereby eliminating the waste of costly Freon and adding to the safety of the device.

It measures the amount of oil being injected and acts as a storage container for oil when not being used. It maintains the oil free of dirt and of air and of course, moisture cannot enter the oil once it is within the cylinder.

There is only need to purge a relatively short line and of course, there is no chance of overcharging a system with Freon which may happen with the use of conventional methods.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. In a refrigeration system which includes a compressor and an evaporator with the usual conduits extending therebetween and having a refrigerant charging port on the high or low pressure sides of the compressor; a device for injecting a predetermined amount of refrigerant oil into said system, said device comprising in combination a cylinder, a piston reciprocal within said cylinder, an end cap on one end of said cylinder, a piston rod extending from one side of said piston and screw threadably engaging through said end cap whereby rotation of said piston rod moves said piston within said cylinder, a further end cap on the other end of said cylinder, filling means in said further end cap and an injector assembly operatively connected to said further end cap, said injection assembly including a manually operated valve, means for purging said injector assembly and means for detachably connecting said injector assembly to the high or low pressure side of a refrigeration system for injecting oil into said system.

2. The device according to claim 1 in which said means for purging said injector assembly includes an intake union downstream of said valve, said union when loosened, releasing refrigerant from said system, through said injection assembly and through said intake union, to atmosphere.

3. The device according to claim 2 in which said injection assembly includes a connecting valve at the distal end thereof operatively connectable with the high or low pressure port of the refrigeration system, in sealing relationship, and including means to open said port when engaged therewith.

4. The device according to claim 3 in which said injection assembly includes an injection nozzle operatively connectable to said connecting valve, said nozzle being operatively engageable with one of said ports when said refrigeration system is non-pressurized, said injection nozzle including means to open said connecting valve when connected therewith.

5. The device according to claim 4 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

6. The device according to claim 3 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

7. The device according to claim 1 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

8. The device according to claim 2 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

9. The device according to claim 1 in which said injection assembly includes a connecting valve at the distal end thereof operatively connectable with the high or low pressure port of the refrigeration system, in sealing relationship, and including means to open said port when engaged therewith.

10. The device according to claim 9 in which said injection assembly includes an injection nozzle operatively connectable to said connecting valve, said nozzle being operatively engageable with one of said ports when said refrigeration system is non-pressurized, said injection nozzle including means to open said connecting valve when connected therewith.

11. The device according to claim 10 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

12. The device according to claim 9 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

13. The combination of a refrigeration system and a device for injecting a predetermined amount of refrigerant oil into said system, said system including a compressor and an evaporator with conventional conduits extending therebetween and including a refrigerant charging port on the high or low pressure side of the compressor, said device including a cylinder, a piston reciprocal within said cylinder, an end cap on one end of said cylinder, a piston rod extending from one side of said piston and screw threadably engaging through said end cap whereby rotation of said piston rod moves said piston within said cylinder, a further end cap on the other end of said cylinder, filling means in said further end cap and an injector assembly operatively connected to said further end cap, said injection assembly including a manually operated valve, means for purging said injector assembly and means for detachably connecting said injector assembly to the high or low pressure side of a refrigeration system for injecting oil into said system.

14. The device according to claim 13 in which said means for purging said injector assembly includes an intake union downstream of said valve, said union when loosened, releasing refrigerant from said system, through said injection assembly and through said intake union, to atmosphere.

15. The device according to claim 14 in which said injection assembly includes a connecting valve at the distal end thereof operatively connectable with the high or low pressure port of the refrigeration system, in sealing relationship, and including means to open said port when engaged therewith.

16. The device according to claim 15 in which said injection assembly includes an injection nozzle operatively connectable to said connecting valve, said nozzle being operatively engageable with one of said ports when said refrigeration system is non-pressurized, said injection nozzle including means to open said connecting valve when connected therewith.

17. The device according to claim 16 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

18. The device according to claim 15 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

19. The device according to claim 14 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

20. The device according to claim 13 in which said injection assembly includes a connecting valve at the distal end thereof operatively connectable with the high or low pressure port of the refrigeration system, in sealing relationship, and including means to open said port when engaged therewith.

21. The device according to claim 20 in which said injection assembly includes an injection nozzle operatively connectable to said connecting valve, said nozzle being operatively engageable with one of said ports when said refrigeration system is non-pressurized, said injection nozzle including means to open said connecting valve when connected therewith.

22. The device according to claim 21 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

23. The device according to claim 20 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

24. The device according to claim 13 in which the relationship between the diameter of said piston and cylinder and the pitch of the screw threads of said piston rod are such that a predetermined amount of travel of said rod ejects a predetermined volume of oil through said injection assembly and indicating means along the length of said piston rod for indicating said predetermined distance of travel thereof.

* * * * *